3,808,162
PREPARATION OF URETHANES AND
CATALYSTS THEREFOR
Michael George Allen, Hudson, Wis., Mohammad S.
Nozari, Woodbury, Wash., and George Van Dyke Tiers,
St. Paul, Minn., assignors to Minnesota Mining and
Manufacturing Company, St. Paul, Minn.
No Drawing. Filed Oct. 10, 1972, Ser. No. 295,892
Int. Cl. C08g 22/40, 22/42
U.S. Cl. 260—18 TN            34 Claims

ABSTRACT OF THE DISCLOSURE

The reaction of polyisocyanates with polyhydroxy organic compounds to form polyurethanes is catalyzed with a catalyst system comprising a soft-acid metal compound, e.g., stannous octoate, in combination with a carboxylic acid having a $pK_a$ greater than about 0.23, e.g., 2-ethylhexanoic acid.

---

This invention relates to the preparation of polyurethanes. In another aspect, it relates to a novel catalyst system for the reaction between polyisocyanates and polyols to produce polyurethanes. In a still further aspect, it relates to a polyurethane (either cellular or non-cellular) having hydrolytic stability.

It is well-known that the reaction of organic polyisocyanates with organic polyhydroxyl compounds, e.g., poly(oxyalkylene) polyols, to produce polyurethanes can be controlled with the proper choice of catalyst (see, for example, "Polyurethanes: Chemistry & Technology," part I, edited by J. H. Saunders and K. C. Frisch, John Wiley & Sons, copyright 1962, p. 211 ff.).

Compounds described in the prior art as catalysts for the preparation of polyurethanes include soluble compounds of antimony, arsenic, bismuth, lead, and tin. Some catalysts cause rapid gelling of the reaction mixture, i.e., the pot life of the mixture is relatively short, which limits the ability of such compositions to be mechanically worked (e.g., shaped, molded, extruded, etc.). These catalysts, although useful in the production of some polyurethane elastomers, have been found to be sensitive to the presence of moisture. By water sensitivity it is meant that the presence of even small amounts of water in the polyisocyanate-polyol system enables some foaming to occur during the formation of the polyurethane product. In the essentially complete absence of moisture, non-cellular polyurethane elastomers are obtained. However, in the presence of even small amounts of water, the activity of the aforementioned catalysts has been found either to be severely inhibited or such catalysts promote undesirable side reactions between the water and the isocyanate with the consequential formation of products with inferior properties, such as undesirable porosity, tackiness, softness, etc.

The undesirable side reaction of isocyanates with water that may occur in the formation of polyurethane can be substantially avoided without inhibition of catalytic activity by using as catalysts certain mercuric salts of carboxylic acids, e.g., phenyl mercuric acetate (see, for example, U.S. Pat. 3,592,787). These mercury compounds, although having improved catalytic activity for the reaction of polyisocyanates with organic compounds having two or more hydroxyl groups, apparently also catalyze the hydrolytic degradation of the cured solid polyurethane elastomers when the cured elastomers are later exposed to certain conditions of humidity and temperature. In addition, pollution effects of mercury compounds on the environment have been reported (see, "Mercury in the Environment—The Human Element," Oak Ridge National Laboratory report, March 1971, ORNL-NSF-EP-1, available through the Department of Commerce) possibly making their use undesirable.

Accordingly, it is an object of this invention to provide a novel catalyst system for the production of non-cellular polyurethanes, which catalyst system promotes the reaction of polyisocyanates with organic polyhydroxy compounds to the substantial exclusion of a reaction of polyisocyanates with water, with longer gel time, and a faster cure rate.

It is yet another object to provide a process for the production of polyurethane prepolymers by reacting an excess of polyisocyanates with organic compounds having two or more hydroxyl groups in the presence of a catalyst which promotes the reaction and yields a polyurethane prepolymer product which may be further reacted (e.g., with water or polyols) to form a hydrolytically stable cellular or non-cellular polyurethane or poly-(urethane-urea).

It is another object of the invention to provide a curable polyurethane formulation or composition useful for the production of non-cellular (i.e., solid) elastomeric polyurethanes, which composition has increased pot-life and which is relatively insensitive to the presence of water.

It is yet another object of this invention to produce polyurethanes with the novel catalyst system of this invention which are hydrolytically stable.

In accordance with one aspect of this invention, polyurethanes are formed by reacting at least one polyol and at least one polyisocyanate in the presence of a novel catalyst system which comprises a soft-acid metal compound (e.g., stannous octoate) in combination with a carboxylic acid compound having a $pK_a$ of greater than 0.23 (e.g., 2-ethylhexanoic acid). The catalyzed reaction mixture has increased pot-life with a fast cure rate and is relatively insensitive to the presence of water.

The substantially moisture insensitive catalyst system of this invention comprises a combination or mixture of particular soft-acid metal compounds and acid compounds. The concept of soft-acids and hard-acids is described in a feature article by Ralph G. Pearson et al., in Chemical and Engineering News 42, 90 (May 31, 1965) and a paper by Russell S. Drago et al., Journal of the American Chemical Society, vol. 93, pp. 6014–6026 (1971). In accordance with this concept soft-acids are compounds having an acceptor atom which is frequently of low oxidative state, large size, and has several easily excited outer electrons. An important point is that the softness of an acid depends on the group with which it is associated. Soft-acid metal compounds, therefore, are salts or complexes of Lewis acid metals which meet this requirement of having an acceptor atom which is frequently of low oxidative state, large size, and having several easily excited outer electrons.

The term soft-acid metal compounds as used in the practice of this invention also include borderline compounds within a specific quantitative range of measureable characteristics as defined in the work by Drago et al. (supra).

The compounds which are included in the term soft-acid metal compounds as used herein are metal salts or complexes wherein the compounds have the characteristic of a ratio of the susceptibility of the acid to form covalent bonds ($C_A$) to the susceptibility of the acid to undergo electrostatic interaction ($E_A$) which is greater than 0.20 or the compounds have a $C_A$ of greater than 0.50 according to the above cited Drago et al. article.

The particular soft-acid metal compounds of use in the practice of this invention are readily hydrolyzable soft-acid metal compounds or are soft-acid metal compounds which react with acids to form easily hydrolyzable soft-acid metal compounds. The term "readily hydrolyzable soft-acid metal compounds," as used in this application refers to metal salts or complexes that have a half-life in water of less than about 10 minutes when determined by procedures well-known in the art such as that described in Coordination Chemistry, edited by S. Kirschner, Plenum Press, New York (1969), page 217.

The readily hydrolyzable soft-acid metal compounds suitable for use in the catalyst system of the invention are the salts and complexes of a metal selected from those which are soluble in a liquid polyoxyalkylene polyol and the metals of which have their valences satisfied by at least one monovalent radical selected from halide, acyloxy, thiol, alkyl (which includes a straight, branched and cyclic alkyls), phenyl, naphthyl, alkenyl, and cycloalkenyl radicals, and no more than one divalent radical selected from oxygen and sulphur, both valences of which are attached to one metal atom. Carboxylate radicals, i.e., active hydrogen, free residues of alkyl carboxylic acids are preferred anionic groups for the soft-acid metal compounds of this invention. The more preferred carboxylates are those having 6 to 10 carbon atoms.

The metals that can be used to form soft-acid metal compounds with the proper selection of the anionic group(s) include, for example, tin, antimony, molybdenum, barium, cadmium, cesium, chromium, cobalt, copper, iron, lead, manganese, indium, nickel, silver, zinc, dysprosium, titanium, aluminum, vanadium, tungsten and palladium. Of these, the most effective soft-acid metal compounds for use in the catalyst system of this invention have been obtained from tin, antimony, and molybdenum. Where not otherwise indicated, all the valence states of metals are useful in forming soft-acid metal compounds for the practice of this invention.

Representative examples of particular soft-acid tin compounds include trihydrocarbyl tin compounds such as, for example, trimethyltin chloride, triethyltin bromide, trimethyltin hydroxide, trimethyltin acetate, triethyltin chloride, tributyltin hydroxide, trimethyltin acetate, triethyltin chloride, tributyltin chloride, tributyltin bromide, tributyltin iodide, tributyltin flouride, triallyltin chloride, triallyltin bromide, triphenyltin chloride and triphenyltin hydroxide; dihydrocarbyl tin compounds, such as dimethyltin diacetate, dilauryltin diacetate, dibutyltin dilaurate, dibutyltin (bis(isooctylmercaptoacetate), dibutyltin maleate, diallyltin diacetate, bis(dibutyltin) adipate, dimethyltin dichloride, dioctyltin dichloride, diphenyltin dichloride, dibenzyloxytin dihydroxide, dibenzyloxytin dichloride, diethyltin diacetate, dicyclohexyltin dichloride, dicyclohexenyltin dichloride, dimethyltin malonate, dimethyltin oxide, diethyltin oxide, dibutyltin oxide, dioctyltin oxide, dilaurylitn oxide, diphenyltin oxide, dibutyltin sulfide, and diphenyltin sulfide; monohydrocarbyl tin compounds including methyltin trichloride, methyltin triacetate, allyltin triacetate, butyltin trichloride, octyltin trichloride, and trimethyltin laurate; stannous laurate; stannous salts of carboxylic acids including, for example, stannous acetate, stannous propionate, stannous hexanoate, stannous 2-ethylhexanoate, (stanous octoate), stannous decanoate, stannous laurate, stannous stearate, stannous oleate, stannous phthalate, stannous benzoate, stannous chloride and stannous iodide.

Representative examples of particular soft-acid antimony compounds include dimethylantimony chloride, dibutylantimony chloride, dibutylantimony acetate, diphenylantimony acetate, diphenylantimony trichloride, diamyloxyantimony bromide, -naphthylantimony dichloride, dibutylantimony hydroxide, tetramethylantimony bromide, antimony triacetate and antimony trichloride.

Represenative examples of suitable soft-acid molybdenum compounds include molybdenum triacetatae, molybdenum trioctoate, molybdenyl acetyl acetonate, molybdenum dichloride, molybdenum diiodide, molybdenyl oxytriacetate, molybdenum (V) naphthenate, molybdenum (VI) oxalate, and molybdenum (VI) acetylacetonate.

The anionic groups completing the salts or complexes listed directly above for tin, antimony, and molybdenum may generally be used to form soft-acid metal compounds with the other metals listed as useful, as long as the combination satisfies the quantitative limitations defining soft-acid metal compounds according to the practice of this invention.

Most preferred soft-acid metal compounds for the catalyst system for use in the practice of this invention are the readily hydrolyzable soft-acid tin compounds, examples of which are listed above. Those catalyst systems which utilize these compounds aid in forming polyurethane materials which have greater hydrolytic stability. More preferred soft-acid metal compounds are the soft-acid stannous carboxylates of which the most preferred is stannous 2-ethyl hexanoate (stannous octoate).

Generally the amount of catalyst system (soft-acid metal compound in combination with the acid component) used in accordance with this invention can vary from about 0.01 to 25% of the total weight of the mixture of polyisocyanate and polyhydroxy reactant compounds.

Generally the ratio of the acid compound to the soft-acid metal compound varies over a wide range and is dependent upon the reactive state of the metal in the soft-acid metal compounds. The lowest ratio that can be accepted for any of the catalyst systems is about a 1:3 molar ratio (acid/metal compound), and the highest molar ratio that can be useful is about 60:1. The broad range of preferred molar ratios for all these systems lies between 1:2 and 12:1. If the particular ratio of acid to the particular metal compound is below the minimum for that particular catalyst system, there is insufficient acid in the system to endow the system with the advantageous properties resulting from the use of the catalyst system of this invention such as increased gel time, insensivity of the reaction to the presence of water, rapid cure rate, etc. If the ratio of acid/metal compound is greater than the maximum limit, the polyurethane product is generally too greatly plasticized from the acid which most often is undesirable. The narrow, preferred range of ratios is that range wherein the non-cellular polyurethanes formed in the presence of the catalyst system of this invention has the preferred range of properties, e.g., non-cellular, flexible, hard, non-tacky, etc.

Functionally stated, the amount of catalyst system and the ratio of the two components used are those amounts sufficient to at least increase the gel time of the polyisocyanate-polyol reaction mixture over the gel time using comparable conventional catalysts. Where stannous compounds are used, the molar ratio of the acid to the stannous compound can be 1:1 to 30:1 with 5:1 through 10:1 preferred. Stannic compounds can be used in acid/metal compound molar ratios of 3:10 to 4:1 with a preferred range of 1:1 to 5:2. Each of the metal compound and each valence state of the metal has its own range of preferred molar ratios of the acid to the metal compound; however, the range of these molar ratios for tin, antimony and molybdenum all lie within the range of 1:3 through 60:1, acid to soft-acid metal compound. The greater the amount of acid compound used, the longer the pot-life, and the greater the amount of particular soft-acid metal catalyst used, the shorter is the cure time. The use of greater amounts of soft-acid metal catalyst is without further benefit and the use of greater amounts of acid compound results in plasticizing the polyurethane obtained and may too greatly slow the cure of the polyurethane.

If the acid is directly reactive with the soft-acid metal compound, the initial ratio of the amount of acid to metal compound must be sufficiently high so that after the reaction of the acid and the metal compound (with either the cationic or anionic portion) there must remain a sufficient residue to keep the acid/metal compound molar ratio within the desired limits.

As for the example in the case of a soft-acid metal hydroxide, sufficient acid must be present in the system to convert the hydroxide to another salt or complex and still remain in the composition in the quantity range and ratio to the metal salt needed for the practice of this invention.

The acid compounds generally useful in the practice of this invention include any carboxylic acid containing compound which has a $pK_a$ of greater than that of trifluoroacetic acid which has a $pK_a$ of about 0.23. (A. Albert and E. P. Serjean, Ionization Constants of Acids and (1962).)

Suitable acid compounds for use in the catalyst system are carboxylic acids, amine salts of carboxylic acids, and compounds which readily hydrolyze to form carboxylic acids. These three types of compounds may be defined as carboxylic acid-containing compounds, because under certain conditions the latter two may generate carboxylic acids (e.g., low pH for the amine salts and water for the hydrolyzable compounds).

Carboxylic acids of use in the catalyst system are any conventional normally liquid or low melting carboxylic acid including hydrocarbyl and substituted hydrocarbyl carboxylic such as the alkyl, aralkyl, aryl, alkaryl, cycloalkyl, alkenyl, or cycloalkenyl carboxylic acids. Preferred examples include alkyl carboxylic acids, e.g., acetic acid, propionic acid, octanoic acid, lauric acid, stearic acid, chloroacetic acid, dichloroacetic acid, and trichloroacetic acid; aryl carboxylic acids, e.g., benzoic acid; alkenyl acids, e.g., acrylic acid, oleic acid, and linoleic acid; cycloalkyl carboxylic acid, e.g., cyclohexanoic acid. Polycarboxylic acid containing compounds can also be used in the practice of this inventiton.

Compounds which readily hydrolyze to form carboxylic acid that can be used as the acid component in the catalyst system of the invention are compounds that have a half-life in water of less than about 1 hour when determined as described hereinabove for the easily hydrolyzable soft-acid metal compounds. Examples of such compounds include organic acid anhydrides, e.g., acetic anhydride, propionic anhydride, octanoic anhydride, and benzoic anhydride; silanes, e.g., methyl triacetoxysilane, ethyl triacetoxysilane, vinyl triacetoxysilane, dimethyl diacetoxysilane, trimethyl acetoxysilane and silicon tetraacetate.

The generally preferred acid compounds for use in the catalyst system of the invention are alkyl carboxylic acids (alkanoic acids), and more preferred acids, including alkyl, carboxylic acid (alkanoic acids) have no hydroxyl groups. Acids with chain lengths of greater than 20 carbon atoms act too efficiently as a plasticizer are not preferred in this class, although useful when high plasticity is desired. Therefore, alkyl carboxylic acids (alkanoic acids) having 20 or fewer carbon atoms are preferred. Within the range of 1–20 carbon atoms, those with 6–10 carbon atoms are most preferred for forming hard non-cellular urethane elastomers, the lower weight ($C_1$–$C_5$) acids being too volatile for optimum properties although they are useful. The most preferred acid compound is 2-ethylhexanoic acid, especially for use in catalyst systems containing stannous 2-ethyl hexanoate. It has generally been found that hydroxy-substituted acids are not preferred because they may react with the isocyanate group.

The carboxylic acid-salt compounds of this invention should be soluble in an aqueous solution and should also have a $pK_A$ greater than that of trifluoroacetic acid. The more preferred salts are those which react with isocyanate groups to liberate acids.

The polyisocyanate materials used in the practice of this invention are well-known in the art and can be represented by the formula $R(NCO)_n$, where R is an organic radical such as aryl, alkyl, cycloalky, combinations thereof, etc., and $n$ is 2 to 5.

Preferred organic polyisocyanates of use in the practice of this invention are the aromatic polyisocyanates ordinarily used in urethane chemistry such as the moderately hindered arylene diisocyanates as, for example, the toluene diisocyanate isomers. However, unhindered diisocyanates such as 4,4-biphenylene diisocyanates and 4,4'-methylene-bis(phenylisocyanate) and strongly sterically hindered diisocyanates such as 3,3'-dimethoxy-4,4'-biphenylene diisocyanate and durene diisocyanate are also useful in the practice of this invention. Triisocyanates such as triphenylmethane triisocyanate and higher polyisocyanates can also be used as, for example, the reaction product of an excess of toluene diisocyanate with trimethylol propane. Aliphatic polyisocyanates can also be used. The preferred polyisocyanates to be used will be aromatic polyisocyanates because the prepolymers made therefrom will generally react faster with water when forms are desired and sufficient water is used. One of the most useful polyisocyanate compounds which can be used for this purpose is tolylene diisocyanate, particularly as a blend of 80 weight percent of toluene-2,4-diisocyanate, and 20 weight percent of toluene-2,6-diisocyanate. A 65:35 blend of the 2,4- and 2,6-isomers is also useful. These polyisocyanates are commercially available under the trademark Hylene TM, Nacconate 80, and Mondur TD–80. Other useful polyisocyanate compounds which can be used are other isomers of tolylene diisocyanate, hexamethylene-1,6-diisocyanate, diphenylmethane-4,4' - diisocyanate, m- or p-phenylene diisocyanate, and 1,5-naphthalene diisocyanate. Polymeric polyisocyanates can also be used, such as polymethylene polyphenyl polyisocyanates, such as those sold under the trademarks Mondur MRS and PAPI. A list of useful commercially available polyisocyanates is found in "Encyclopedia of Chemical Technology," by Kirk and Othmer, 2d ed., vol. 12, pp. 46–47, Interscience Pub. (1967).

NCO-capped prepolymers can also be used with the catalysts of this invention to produce urethane-modified polyisocyanurates. Such prepolymers can also be used in admixture with polyols and the mixture catalyzed to produce products with urethane and isocyanurate linkages. Such NCO-capped prepolymers are well-known (see U.S. Pat. Nos. 3,073,802 and 3,054,755) and are generally prepared by reacting an excess of polyisocyanates, such as an aromatic diisocyanate with polyalkylene ether glycols, or polyester glycols. Prepolymers are sold under the trademarks Multrathane and Adriprene. The isocyanate can also be used in the form of a blocked isocyanate.

The polyols to be reacted with polyisocyanates are preferably those in which the carbon bearing the —OH group also bears at least one H atom. These primary or secondary alcohols tend to form more stable reaction products than do tertiary alcohols.

Suitable organic polyhydroxy compounds for reaction with the organic polyisocyanates include simple aliphatic polyols such as ethylene glycol, 1,2-propylene glycol, 1,3-butylene glycol, 2,3-butylene glycol, tetramethylene glycol, pentamethylene glycol, hexamethylene glycol, decamethylene glycol, 2,2-dimethyltrimethylene glycol, glycerine. Trimethylolethane, trimethylolpropane, pentaerythritol, sorbitol, 1,6-hexanediol, 1,2,6-hexanetriol, 2-ethyl-1,3-hexanediol, castor oil, polyvinyl alcohol and partially hydrolyzed polyvinyl acetate; carbohydrates containing 5 to 8 hydroxyl groups such as sucrose, dextrose, and methylglucoside, ether polyols such as diethylene glycol and dipropylene glycol; aromatic polyols such as diphenylene glycol; and mixtures thereof.

Suitable higher molecular weight organic polyhydroxy compounds are the polyether polyols (or polyoxyalkylene polyols) prepared by reaction of any of the above polyols with an alkylene oxide such as ethylene oxide, 1,2-propylene oxide, 1,3-propylene oxide, epichlorohydrin, epibromohydrin, 1,2-butene oxide and tetrahydrofuran. These polyether polyols are described by Price in U.S. Pat. No. 2,886,774 and include polyethylene glycol and polytetramethylene ether glycol. These polymeric polyols will have average molecular weights of from 200 to 8000, preferably 400 to 2000. Preferably, these polymeric polyols will be diols or triols.

An additional class of high molecular weight polyhydroxy compounds for use in accordance with this invention are the polyester polyols prepared by reaction of more than one, but not more than two, hydroxy equivalent weights of any of the above polyols with one equivalent weight of a polycarboxylic acid such as diglycolic, succinic, glutaric, adipic, suberic, azelaic, sebacic, phthalic, isophthalic, terephthalic, chlorendic and pyromellitic acids. Other high molecular weight polyhydroxy compounds include hydroxy-alkyl acrylate and methacrylate monomers and polymers, including copolymers with aromatic compounds containing an ethylenically unsaturated side chain such as those described by Mayer et al. in U.S. Pat. 3,245,941.

Generally, the polyol-polyisocyanate reaction mixtures cured with the catalyst of this invention can have

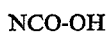

equipvalent ratios in the range of 1/1 to 12/1, and even higher, e.g., 20/1 to 40/1, preferably at least 1.2/1 since below the latter the product will contain unreacted or free hydroxyl groups (which have a plasticizing function) and will be a more flexible product. The most preferred range is about 2.1/1 to 4/1 NCO/OH equivalents.

The hardness and elasticity of the polyurethane can be controlled within relatively close limits by control of the amount of crosslinking, as is well-known in the art. A cross-linked elastomer is created by the inclusion of trifunctional or higher polyfunctional components into the reaction mixture in predetermined amounts, or by building such further functionality into the isocyanate or the polyol reactants of the system to provide a functionality greater than two. Thus, a small amount of a triol or other polyol such as 1,2,6-hexane, triol pentaerythritol, trimethylol propane, glycerol, or polymeric compounds having more than two hydroxyls per molecule may be used. In addition to or in place of a polyol, the polyfunctional component can be a small amount of a triisocyanate or a polyisocyanate of greater functionality, such as that provided by the reaction of tolylene diisocyanate with trimethylol propane as mentioned above or with any of the aforementioned polyols. Usually, from about 1 to about 10% of the trifunctional component is used depending on the hardness desired and the molecular weight of the crosslinking component used: generally, the lower the equivalent weight and the greater the amount of the crosslinking component used, the harder is the polyurethane obtained.

The foam suppressing action of the acid compound of the catalyst system is effective in suppressing the formation of foam in polymerizing urethane compositions containing 0.5 weight percent or more water when the catalyst system contains about 3 weight percent acid compound based on the total weight of urethane composition. The use of more than about 5 weight percent acid compound may be employed, however, with increasing amounts of acid compound, there is an increasing plasticization of the polyurethane obtained.

Filled polymer products can be made by incorporating into the reaction mixtures a host of different powdered or finely divided fillers (e.g., 5 to 25 wt. percent) such as clay, talc, rubbery granular aggregate such as scrap rubber from automobile tires, etc., titanium dioxide, diatomaceous earth, etc. Glass spheroids or microbubbles are useful in making light-weight isocyanurate-modified polyurethane syntatic foamed articles which can be finished by sanding. Co-reactant materials such as the diamines described in U.S. Pat. No. 3,248,454 and amides such as disclosed in U.S. Pat. No. 3,446,771 can be included in the polyol-polyisocyanate reaction mixture, e.g., to increase the viscosity or moldability thereof as well as to increase the hardness of the resulting product; however, the polyisocyanate and polyol reactants are the sole essential reactants to be used in this invention. Fire retardant fillers, such as polyvinyl chloride and antimony or phosphorous compounds can also be incorporated into the reaction mixture. Foamed or porous products of this invention can be made by blowing the reaction mixture with a blowing agent such as water or low molecular weight haloalkanes, e.g., Freon 12. Conventional foam stabilizing agents such as silicone oils or organo-silicones can also be incorporated into such reaction mixtures to obtain foamed products with controlled porosity. A particularly useful foam stabilizer that can be used is a perfluoroalkyl amine, such as those disclosed in U.S. Pat. No. 3,378,399.

The term "gel time" as used in the description of this invention is the time for the total reaction mixture (e.g., polyisocyanate polyol, and catalyst system) to reach such a high viscosity that it is not readily pourable. Many prior art catalysts promote a rather short gel time and a reasonably fast cure rate which makes certain mechanical operations on polyurethane formulation, such as molding, very difficult to perform and left little margin for error in such operations. The increase in gel time generated by the presence of the catalyst system of this invention is therefore a very desirable property added to the reactive mixture.

The Shore A-2 hardness is determined by ASTM Procedure D 2240-68 and is a measure of the surface characteristics of the polyurethane product of this invention.

The rubbery or elastomeric urethane products of this invention can be used to provide roadway or load-bearing surfaces, particularly such as those tracks used for athletic or sporting purposes, and as coatings to provide protective surfaces, for example as rain-proof or water-resistant coatings for clothing. They can be used as laminating resins for sheets of glass fiber and as adhesives for bonding metal to metal, wood to wood, and metal to wood, and as potting compositions for insulating magnet coils or other electrical devices. The hydrolytic stability of the urethane products of this invention means that they can be shaped in the form of articles that are subject to moisture contact during use or which come into contact with aqueous solvents or water, such as gaskets, seals, etc. The prepolymer polyurethane products of this invention may be used, for example, as binders for particulate material (e.g., sand, soil, pebbles, gravel, scrap rubber, etc.).

The polyurethane products made in the catalytic presence of the preferred catalyst system of this invention contain the soft-acid metal compound, and contains an uncombined, carboxylic acid-containing compound. By uncombined it is meant that substantial amounts of the acid can be leached from the polyurethane product by, for example, a solvent for the acid which is not a solvent for the polyurethane. Both the soft-acid metal compound and carboxylic acid-containing compound are preferably intimately mixed or dispersed within the polyurethane product of which they catalyzed the reaction.

The catalyst system of this invention can be used generally in any reactions between polyisocyanates and organic polyhydroxyl compounds or polyols as represented by the generic reaction:

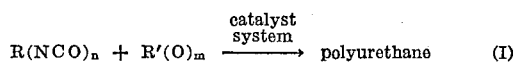

(I)

wherein R and R' are organic radicals and m and n are each integers of at least 2 and can be as high as 5.

More particularly the reactions wherein the catalyst system of this invention can be used can further be illustrated as:

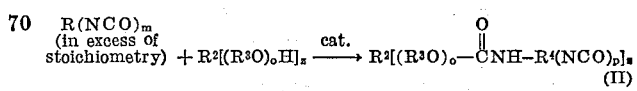

(II)

where R and m are defined above, $R^2$ is the active hydrogen-free residue of an organic compound (such as a polyhydroxyalkane, e.g., ethylene glycol, glycerol, or 1,1,1-trimethylolpropane) having a plurality of hydroxyl groups equal to $z$ (which is an integer of at least 2 and can be as high as 5), $(R^3O)_o$ is a polyoxyalkylene chain having a plurality of oxyethylene or oxypropylene units, or a mixture of both, or being a number equal to the total number of oxyalkylene units in the chain, $R^4$ is the residue or nucleus of the polyisocyanate precursor (i.e., the isocyanate-free residue of said polyisocyanate) and $p$ is an integer equal to $m-1$.

The prepolymer product of Formula II can be further reacted to form either a hydrolytically stable polyurethane foam or a non-cellular polyurethane with the appropriate selection of reactants, as illustrated hereinafter. With the addition of sufficient water or polyol and blowing agents polyurethane foams can be produced, and with the addition of polyols to the prepolymer, non-cellular polyurethanes may be produced.

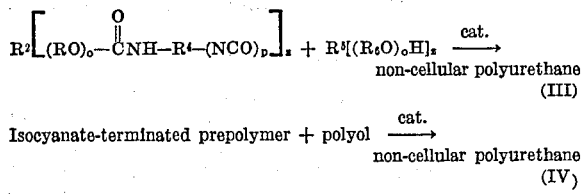

$$\text{Isocyanate-terminated prepolymer} + \text{polyol} \xrightarrow{\text{cat.}} \text{non-cellular polyurethane (IV)}$$

Reaction IV indicates the general utility of the catalyst system of this invention in catalyzing all reactions between isocyanate-terminated prepolymers and polyols.

It should be pointed out that reactions II, III, IV can be carried out in the presence of minor amounts of water without generating any foam in the products because of the moisture insensitivity of the catalyst system of this invention. The water used in reaction II is of such larger quantities that the acid cannot act to suppress the reaction between the isocyanate and the water, possibly because the water washes the acid away from the isocyanate, allowing it to react with water.

Examples of reactions II, III and IV are as follows:

EXAMPLE 1, REACTION II

Into a reaction vessel were charged 437 parts by weight of toluene diisocyanate, 157.5 parts by weight of polyoxyethyleneglycol (molecular weight of 1000), 0.44 part stannous 2-ethylhexanoate and 0.44 part 2-ethylhexanoic acid. The mixture was heated to 71° C. and held at this temperature for two hours. The mixture was then cooled at room temperature yielding a reaction product of a mixture of an isocyanate-terminated urethane prepolymer and toluene diisocyanate. This prepolymer can be cross-linked with water to form a poly(urethaneurea) useful, for example, as a binder for particulate material, e.g., sand, soil, pebbles, gravel, scrap rubber, etc.) to make a load-bearing surface, such as a pavement, the binder having excellent hydrolytic stability.

EXAMPLE 2, REACTION III

An isocyanate-terminated prepolymer was formed by mixing 66.1 parts by weight toluene diisocyanate, 17.7 parts by weight polyoxypropylene glycol (molecular weight 2000) and 16.2 parts by weight polyoxypropylene triol (molecular weight 1500).

Into a reaction vessel were charged 455 grams of stannous octoate, 910 grams of 2-ethyl hexanoic acid, and 400 pounds of a polyol mixture consisting of 29.9 parts by weight polyoxypropylene glycol (MW, 2000), 24.3 parts polyoxypropylene triol (MW, 1500), 45.4 parts white clay, 0.03 part cyano blue dye, and 0.10 part 4-methylene-bis (2,6-diethylaniline) as a surface active compound. The polyol-catalyst mixture was stirred for one hour.

The prepolymer and the polyol-catalyst mixture were then mixed together, gelling taking place in about 9-12 minutes, finally yielding a non-cellular, hydrolytically stable polyurethane with a Shore A hardness greater than 40. This preparation is suitable for molding shaped structural articles, such as shock-absorbing coverings, and vibration dampers.

EXAMPLE 3, REACTION IV

An isocyanate-terminated prepolymer is prepared by mixing 6.3 parts by weight of polyoxypropylene triol (molecular weight 440), 31.4 parts by weight of polyoxypropylene diol (molecular weight 400) and 62.3 parts by weight of toluene diisocyanate. The resultant prepolymer had an isocyanate equivalent weight of 190 to 195 and a viscosity of 1500 to 2500 centipoises.

A second mixture was prepared having 97.4 parts by weight of castor oil, 1.0 parts stannous 2-ethylhexanoate, and 1.6 parts 2-ethylhexanoic acid.

In forming the polyurethane final product, 5 parts by weight of the isocyanate-terminated prepolymer and 8 parts by weight of the castor oil catalyst mixture were mixed together. The viscosity of the resulting mixture remained under 10,000 centipoises for 25 to 40 minutes and set to a gel in about 4 hours. After 16 hours at room temperature, the non-cellular polyurethane was non-tacky and exhibited a Shore A hardness of 30 to 40. After three days, the Shore A hardness was 54. Because of the extended gel time of this reaction mixture, it can advantageously be used to form molded articles, such as car molding, gaskets, and seals.

Further exemplification of the practice of this invention is shown by the following further examples. The percentages of materials used in the following examples are weight percentages unless otherwise indicated.

EXAMPLE 4

Two separate polyurethane formulations, A and B, were prepared. Formulation A consisted of:

50 grams polyoxypropylene triol (molecular weight of 1500)

13.3 grams polyphenylenepolymethylene polyisocyanate (Mondur MRS, having an isocyanate equivalent weight of 133)

0.4 grams stannous 2-ethylhexoate (1% by wt.)

Formulation B was the same as Formulation A except that 0.8 grams 2-ethyl hexanoic acid was added.

Samples of each of the two formulations were placed immediately after mixing in Gardner Bubble Viscometer tubes and the viscosity measured at various intervals of time. The results appear in the following table.

TABLE I

| Time (minutes) | Viscosity (stokes) | |
|---|---|---|
|  | Formulation A | Formulation B |
| 1 | 25 | 25. |
| 2 | 100 |  |
| 5 | 600 | 100. |
| 8 | 1,000 | 150. |
| 10 | Off scale [1] | 200. |
| 15 |  | 800. |
| 20 |  | Off scale.[1] |

[1] When the viscosity is off the scale, the formulation has gelled.

The above data show that the induction period for Formulation B (which contains the catalyst system of this invention) is significantly longer than that for Formulation A (which has only a metal compound). This means that the gel time (or pot life) is sufficiently long so that Formulation B can be mechanically worked, drawn, extruded, molded, etc.) with greater facility because it does not have to be moved to the shaping apparatus as quickly after mixing as does Formulation A and has greater time to conform to a desired shape. In view of the short gel time for Formulation A, the extension of the gel time or pot-life is highly advantageous.

It will also be seen from the data that once the reaction leading to increased viscosity does start to take place, the cure rate is as fast or faster than that of the system without the acid.

EXAMPLE 5

In each of a plurality of runs a polyurethane formulation of 50.0 g. polyoxypropylene triol (average molecular weight of 1500 and a hydroxyl equivalent weight of 500), 13.3 grams of polyphenylenemethylene-isocyanate having an isocyanate equivalent weight of 133), was used as the standard formulation. Varying amounts of stannous octoate (Sn[Oct]$_2$) and 2-ethylhexanoic acid (EHA as indicated in the table below were added to the formulation and cured for 12 minutes at varying temperatures and the Shore A-2 hardness measured. The results are as follows:

TABLE II

| Curing temp., °F. | Weight percent of— Sn[Oct]$_2$ | EHA | Shore A-2 Hardness |
|---|---|---|---|
| 175 | 1.0 | 0.0 | 45 |
|  | 1.0 | 0.5 | 63 |
|  | 1.0 | 1.0 | 63 |
|  | 1.0 | 2.0 | 64 |
|  | 1.0 | 3.0 | 62 |
| 200 | 0.8 | 0.0 | 48 |
|  | 0.8 | 0.4 | 61 |
|  | 0.8 | 0.8 | 68 |
|  | 0.8 | 1.6 | 68 |
|  | 0.8 | 2.4 | 66 |
| 225 | 0.6 | 0.0 | 37 |
|  | 0.6 | 0.3 | 56 |
|  | 0.6 | 0.6 | 60 |
|  | 0.6 | 1.2 | 70 |
|  | 0.6 | 1.8 | 66 |
| 250 | 0.4 | 0.0 | 48 |
|  | 0.4 | 0.2 | 61 |
|  | 0.4 | 0.4 | 64 |
|  | 0.4 | 0.8 | 71 |
|  | 0.4 | 1.2 | 68 |

As can be seen from the data of the example, the combination of the acid with the soft-acid metal compound yields a polyurethane elastomer product with a consistently higher Shore A-2 hardness independently of the curing temperature than products cured only with the metal compound itself.

EXAMPLE 6

In each of a plurality of runs, the standard formulation was the same as that of Example 5 except for the addition of 0.25 grams of stannous octoate. Different weak carboxylic acids were added in the amounts indicated in the following table and the gel time and Shore A-2 hardness after 48 hours at ambient temperature (approximately 25° C.) was measured. The results were as follows:

TABLE III.—ACID USED

| Compound | Amount, g.-moles | Gel time (min.) | Shore A-2 Hardness (after 48 hrs.) |
|---|---|---|---|
| None | 0 | 10 | 50 |
| 2-ethylhexanoic | 0.0052 | 20 | 56 |
| Glacial acetic | 0.0008 | 13 | 56 |
| Do | 0.0017 | 16 | 54 |
| Octanoic | 0.0007 | 13 | 56 |
| Do | 0.0014 | 16 | 57 |
| Cyclohexane acetic | 0.0007 | 13 | 57 |
| Do | 0.0014 | 17 | 55 |
| Isodecanoic | 0.0003 | 12 | 51 |
| Do | 0.006 | 14 | 55 |
| Tetrachlorophthalic, mono-n-hexyl carbitol ester | 0.0002 | 14 | 52 |
| cis-Cyclohexanedicarboxylic, mono-n-hexyl carbitol ester | 0.0002 | 12 | 52 |
| Do | 0.0003 | 14 | 50 |

As can be seen from the above data, the addition of carboxylic acids to the formulation increases the gel time and yields a product with a Shore A-2 hardness as high or higher than the formulation cured with only the metal catalyst.

EXAMPLE 7

In a plurality of runs the standard formulation for this example was the same as that for Example 6. Various carboxylic acid salts were added to the formulation and the gel time and Shore A-2 hardness after 48 hours cure at ambient temperature were measured. The results are as follows:

TABLE IV.—ACID SALT

| Compound | Amount, g.-moles | Gel time | Shore A-2 Hardness |
|---|---|---|---|
| None |  | 10 | 50 |
| Isopropanol ammonium-2-ethyl-hexanoate | 0.0004 | 14 | 53 |
| N-methyl-ethanol ammonium 2-ethylhexanoate | 0.0009 | 19 | 55 |
| N-methylmorpholium 2-ethyl-hexanoate | 0.0008 | 17 | 55 |
| Do | 0.0016 | 20 | 53 |

As can be seen from the above data, the addition of carboxylic acid salts to the formulation has an effect similar to that caused by the addition of carboxylic acids, increased gel time and hardness.

EXAMPLE 8

To illustrate the effectiveness of the catalyst system of the invention in counteracting the softening effect of water on polyurethane compositions, mixtures were prepared of 50 grams polyoxypropylene triol (molecular weight 1500), 13.3 grams polyphenylene polymethylene polyisocyanate (Mondur MRS), 0.6 gram stannous 2-ethylhexanoate, and the amounts of added water and 2-ethylhexanoic acid shown in Table V. The mixtures were allowed to polymerize and cure at about 25° C. for 18 hours before Shore A-2 hardness on each composition was measured. The effectiveness of 2-ethylhexanoic acid in preventing formation of foam in the stannous 2-ethylhexanoate catalyzed polymerization to form urethanes in the presence of water is indicated in Table V by the relatively higher Shore A-2 values as compared to those where no acid was present. In other words, these data show that the two-component catalyst system of this invention is relatively insensitive to the pressence of water.

TABLE V

| Amount of water, grams (percent) | Shore A-2 Hardness—Amount of 2-ethylhexanoic acid | | | | |
|---|---|---|---|---|---|
|  | None | 0.3 g. (0.5%) | 0.6 g. (1%) | 1.2 g. (2%) | 3.0 g. (5%) |
| 0 (0%) | 60 |  | 60 |  | 60 |
| 0.06 (0.1%) | 46 | 58 | 60 | 60 |  |
| 0.12 (0.2%) | 48 |  |  | 58 | 59 |
| 0.18 (0.3%) | 25 | 38 | 52 | 56 |  |
| 0.31 (0.5%) | 15 | 20 |  | 45 | 46 |

Various modifications and alterations of this invention will become apparent to those skilled in the art without departing from the scope and spirit of this invention, and it should be understood that this invention is not to be limited to the examples set forth herein.

What is claimed is:

1. In a process comprising forming polyurethane by reacting polyisocyanate with organic polyhydroxy in the presence of a catalyst, the improvement comprising using as the catalyst a system which comprises
   (1) at least one soft-acid metal compound selected from the group of molybdenum, antimony, titanium, vanadium, tungsten and tin (IV) compounds and tin (II) salts of carboxylic acids, stannous chloride and stannous iodide, and additionally comprising
   (2) at least one carboxylic acid-containing compound having a pK$_a$ of greater than about 0.23.

2. The process of claim 1 wherein the soft-acid metal compound is selected from soft-acid metal compounds of antimony, molybdenum, titanium, tin (IV) and tin (II) compounds selected from stannous salts of carboxylic acids, stannous chloride and stannous iodide.

3. The process of claim 2 wherein the metal of the soft-acid metal compound is tin, molybdenum, or antimony and the carboxylic acid-containing compound is an alkyl carboxylic acid free of hydroxyl groups.

4. The process of claim 3 wherein the metal of the soft acid metal compound is tin and the carboxylic acid contains from 6 to 10 carbon atoms.

5. The process of claim 2 wherein said polyisocyanate comprises aromatic diisocyanate and the organic polyhydroxy compound comprises aliphatic hydroxy, the carbon atom bearing the hydroxy group also bears at least one hydrogen atom.

6. The process of claim 2 wherein the reaction between said polyisocyanate compound (in excess of the stoichiometric amount) and said organic polyhydroxy is represented by the reaction equation:

$$R(NCO)_m + R^1[(R^2O)_nH]_o \longrightarrow$$

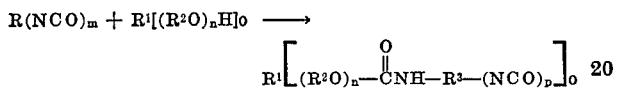

wherein R is an organic radical, $R^1$ is the active hydrogen-free residue of an organic compound, $(R^2O)_m$ is a polyoxyalkylene chain having a plurality of oxyethylene or oxypropylene units, or a mixture of both, $R^3$ is the isocyanate-free residue of said polyisocyanate, $m$ is an integer at least 2, $n$ is an integer equal to the number of oxyalkylene units in said chain, $p$ is an integer equal to $m-1$, and $o$ is an integer of 2 to 5.

7. The process of claim 2 wherein said polyisocyanate is represented by the formula:

wherein R is the active hydrogen-free residue of an organic compound, $(R^1O)_m$ is a polyoxyethylene chain having oxyalkylene units selected from oxyethylene, oxypropylene or a mixture of both, $R^2$ is the isocyanate-free residue of a polyisocyanate precursor, $m$ is an integer equal to the number of polyoxyalkylene units in said chain, $n$ is an integer of at least one, $o$ is an integer of 2 to 5, and where the organic polyhydroxy compound is a diol or triol.

8. The process of claim 2 wherein said soft acid metal compound is derived from an alkanoic acid free of hydroxyl groups.

9. The process of claim 2 wherein the soft-acid metal compound is stannous octoate, the carboxylic acid is 2-ethylhexanoic acid, the polyisocyanate comprises toluene diisocyanate, and the polyol comprises polyoxypropylene polyol.

10. The process of claim 1 wherein the metal of the soft-acid metal compound is antimony and the molar ratio of carboxylic acid containing compound to soft-acid metal compound is between 1:3 to 60:1.

11. The process of claim 1 wherein the metal of the soft-acid metal compound is molybdenum and the molar ratio of carboxylic acid containing compound to soft-acid metal compound is between 1:3 to 60:1.

12. The process of claim 1 wherein the metal of the soft-acid metal compound is titanium.

13. The process of claim 1 wherein the metal of the soft-acid metal compound is vanadium.

14. The process of claim 1 wherein the metal of the soft-acid metal compound is tungsten.

15. The process of claim 1 wherein the metal of the soft-acid metal compound is the stannic valence of tin and the molar ratio of carboxylic acid containing compound to soft-acid metal compound is between 3:10 to 4:1.

16. The process of claim 1 wherein the soft-acid metal compound is selected from the stannous salts of carboxylic acids and the molar ratio of carboxylic acid containing compound to soft-acid metal compound is between 1:1 to 30:1.

17. The process of claim 16 wherein the salts are selected from stannous acetate, stannous propionate, stannous hexanoate, stannous 2-ethylhexanoate, stannous decanoate, stannous laurate, stannous stearate, stannous oleate, stannous phthalate, and stannous benzoate.

18. The process of claim 1 wherein the soft-acid metal compound is selected from stannous chloride and stannous iodide.

19. The process of claim 1 wherein the soft-acid metal compound is a dialkyltin carboxylate.

20. The process of claim 1 wherein the dialkyltin carboxylate is dibutyltin bis(isooctylmercaptoacetate).

21. A polyurethane composition which contains intimately mixed therein
   (1) at least one soft-acid metal compound selected from the group of molybdenum, antimony, titanium, vanadium, tungsten and tin (IV) compounds and tin (II) salts of carboxylic acids, stannous iodide and
   (2) at least one carboxylic acid-containing compound having a $pK_a$ of greater than 0.23.

22. The polyurethane composition of claim 21 wherein the metal of the soft-acid metal compound is titanium and the molar ratio of carboxylic acid containing compound to soft-acid metal compound is between 1:3 to 60:1.

23. The polyurethane composition of claim 21 wherein the metal of the soft-acid metal compound is molybdenum and the molar ratio of carboxylic acid containing compound to soft-acid metal compound is between 1:3 to 60:1.

24. The polyurethane composition of claim 21 wherein the metal of the soft-acid metal compound is antimony.

25. The polyurethane composition of claim 21 wherein the metal of the soft-acid metal compound is the stannic valence of tin and the molar ratio of carboxylic acid containing compound to soft-acid metal compound is between 3:10 to 4:1.

26. The polyurethane composition of claim 21 wherein the metal of the soft-acid metal compound is a stannous salt of a carboxylic acid and the molar ratio of carboxylic acid containing compound to soft-acid metal compound is between 1:1 to 30:1.

27. The polyurethane composition of claim 26 wherein the salts are selected from stannous acetate, stannous propionate, stannous hexanoate, stannous 2-ethylhexanoate, stannous hexanoate, stannous 2-ethylhexanoate, stannous 2-ethylhexanoate, stannous decanoate, stannous laurate, stannous stearate, stannous oleate, stannous phthalate, and stannous benzoate.

28. The polyurethane composition of claim 21 wherein the metal of the soft-acid metal compound is selected from stannous chloride and stannous iodide.

29. The composition of claim 21 wherein the soft-acid metal compound is selected from soft-acid metal compounds of antimony, molybdenum, titanium, tin (IV) and tin (II) compounds selected from stannous salts of carboxylic acids, stannous chloride and stannous iodide.

30. The polyurethane composition of claim 29 wherein the metal of the soft-acid metal compound is tin, molybdenum, or antimony and the carboxylic acid-containing compound is an alkyl carboxylic acid having up to 20 carbon atoms.

31. The polyurethane composition of claim 30 wherein the soft-acid metal compound is stannous octoate, the carboxylic acid-containing compound is 2-ethylhexanoic acid, and the polyurethane is a non-cellular polyurethane elastomer.

32. The composition of claim 21 wherein the soft-acid metal compound is a dialkyltin carboxylate.

33. The composition of claim 21 wherein the soft-acid metal compound is dibutyltin bis(isooctylmercaptoacetate).

34. An isocyanate-terminated urethane prepolymer composition which contains a soft-acid metal compound selected from the group of molybdenum, antimony, titanium and tin (IV) compounds and tin (II) salts of carboxylic acids, stannous chloride and stannous iodide, and additionally containing a carboxylic acid containing compound having a $pK_a$ of greater than 0.23.

References Cited
UNITED STATES PATENTS
2,897,181 7/1959 Windemuth _____ 260—18 TN
3,681,272 8/1972 Gloskey _____ 260—77.5 AB MAURICE J. WELSH, Primary Examiner U.S. Cl. X.R.

260—77.5 AB, 75 NB